United States Patent [19]
Lockshaw et al.

[11] Patent Number: 5,487,930
[45] Date of Patent: Jan. 30, 1996

[54] THREE STRUCTURE STRUCTURAL ELEMENT WITH INTERLOCKING RIBBING

[75] Inventors: James J. Lockshaw, Huntington Beach; Stephen Kelly, Yorba Linda; Randall Walker, Santa Ana; John Kaiser, Jr., Huntington Beach, all of Calif.

[73] Assignee: Tolo, Inc., Irvine, Calif.

[21] Appl. No.: 173,611

[22] Filed: Dec. 27, 1993

Related U.S. Application Data

[63] Continuation-in-part of Ser. No. 771,009, Oct. 3, 1991, Pat. No. 5,273,806.

[51] Int. Cl.⁶ .................................................. B32B 3/00
[52] U.S. Cl. ................. 428/53; 428/133; 428/120; 428/167; 428/172; 428/178; 428/166; 52/793.11; 156/91; 156/290
[58] Field of Search .................... 428/128, 119, 428/120, 33, 167, 156, 166, 101, 99, 172, 188, 53, 133, 273, 593; 52/806, 284, 785; 156/60, 91, 290, 292

[56] References Cited

U.S. PATENT DOCUMENTS

| | | | |
|---|---|---|---|
| 4,304,821 | 12/1981 | Hayase et al. | 428/593 |
| 4,957,788 | 9/1990 | Colonel | 428/33 |
| 5,273,806 | 12/1993 | Lockshaw et al. | 428/167 |

*Primary Examiner*—Donald J. Loney
*Attorney, Agent, or Firm*—Louis J. Bachand

[57] ABSTRACT

A structural element comprising opposed first and second, laterally and longitudinally extended, generally planar surface structures each having a closed figure pattern of ribbing projecting therefrom toward the opposite surface structure, a third structure disposed between the first and second surface structures in ribbing-engaging relation therewith, the opposed ribbing being interlocked across the third structure in registered, mating relation.

33 Claims, 8 Drawing Sheets

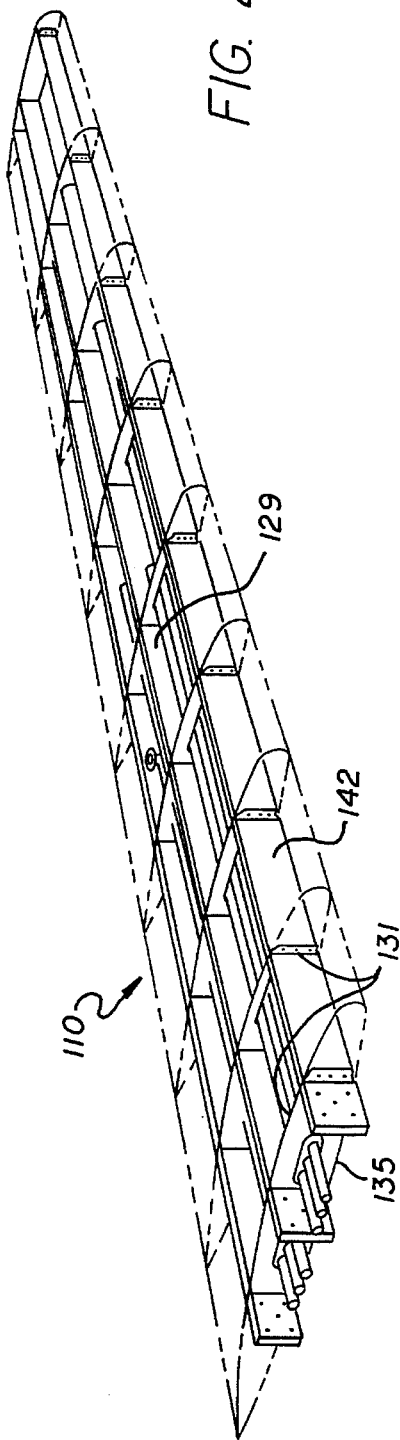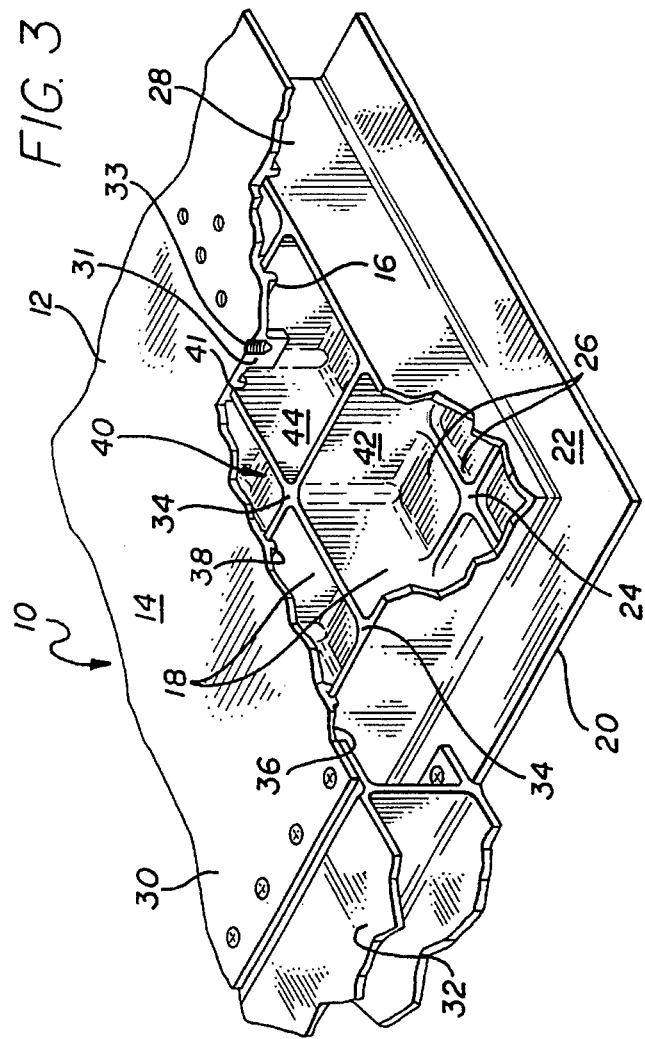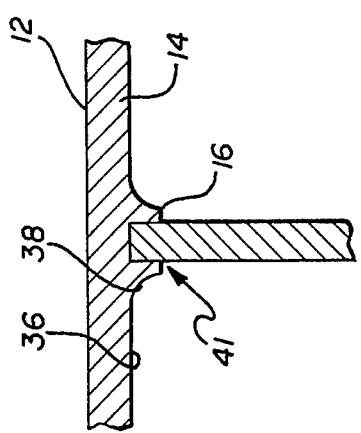

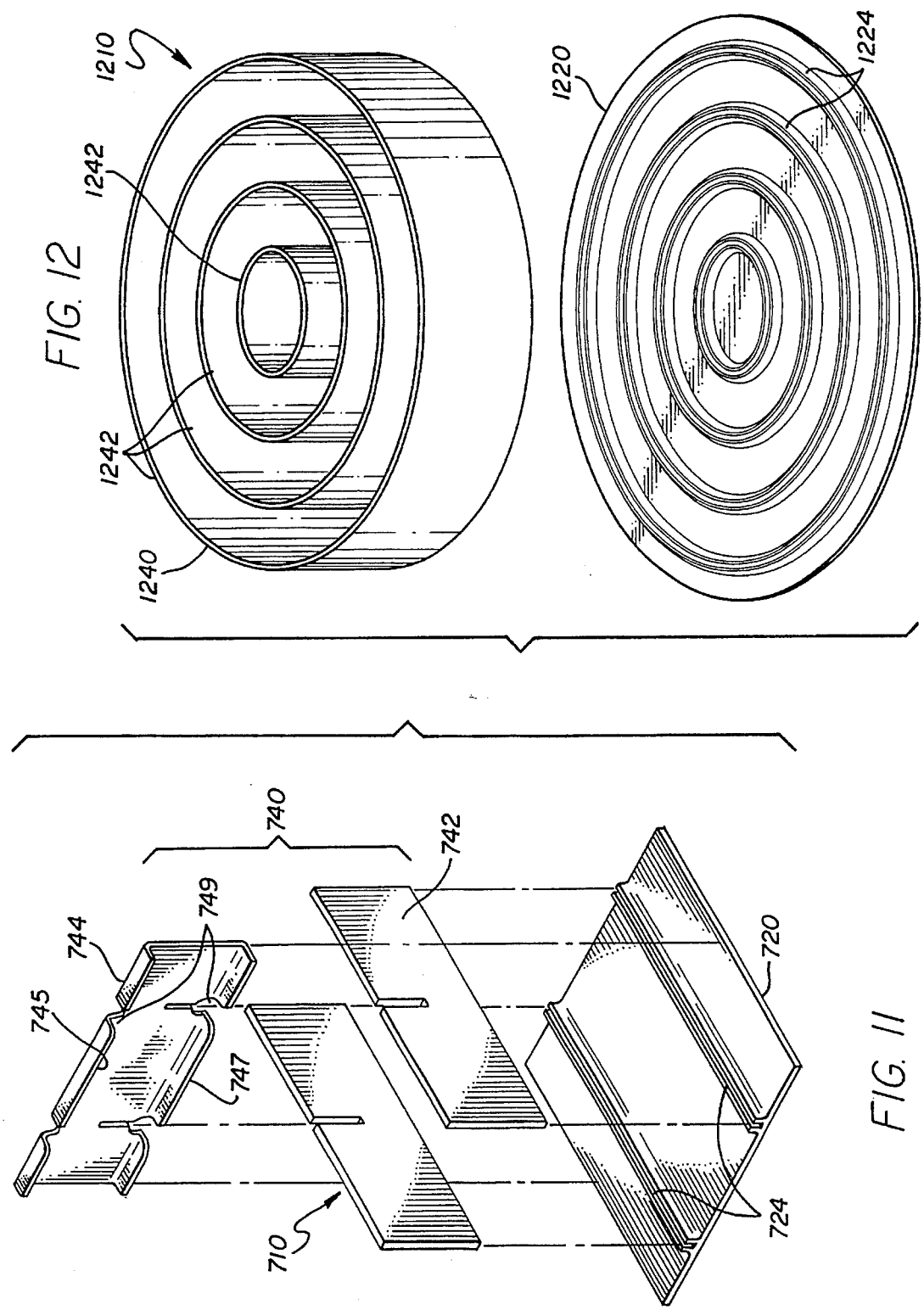

THREE STRUCTURE STRUCTURAL ELEMENT WITH INTERLOCKING RIBBING

REFERENCE TO RELATED APPLICATION

This application is a continuation in part of our application Ser. No. 07/772,009, filed Oct. 3, 1991, now U.S. Pat. No. 5,273,806.

FIELD OF THE INVENTION

This invention relates to structural elements, ranging from aircraft components to enclosures, which are lightweight, extremely strong, widely variable in size, configuration and material of construction, easy to manufacture with widely available equipment, and free of the problems associated with other forms of structural elements serving some of the same purposes, such as honeycomb panels.

More particularly, this invention relates to structural elements having three structures, including first and second surface structures and a third structure interposed between the surface structures, the structures being joined together by interlocking ribbing formed on the surface and third structures, the ribbing forming a closed figure.

BACKGROUND

Aircraft components including engine intake ducts, flooring and wing sections are frequently made of honeycomb material is lightweight, rigid and capable of being fabricated in many shapes. Honeycomb is, however, expensive, difficult to work with, problematic when contour changes are required, awkward to attach other parts to, and not readily repairable. These drawbacks to honeycomb structural elements have been met by reinforcing the element where other parts are to be mounted, by adding brackets at junctions of internal members and, in general, beefing up the structural element, all at the cost of increasing its weight, thus lessening the most significant putative advantage of the honeycomb.

SUMMARY OF THE INVENTION

It is an object, therefore, of the present invention to provide a structural element which affords the advantages of honeycomb but avoids the disadvantages. It is another object to provide a structural element which is widely variable is size and contour with no great change in manufacturing complexity or cost, which is lightweight while offering great strength, which is readily repaired, and which affords easy attachment of other components with no special post manufacturing steps. It is another object to provide increased ease of machining or otherwise fabricating the component structures, by using a third structure separately formed from the first and second structures so that the several parts may be separately formed and no single part need be as complex as when only two structures are employed for comparable structural elements.

These and other objects of the invention, to become apparent hereinafter, are realized in a structural element comprising opposed first and second, laterally and longitudinally extended, generally planar surface structures each having a closed figure pattern of ribbing projecting therefrom toward the opposite surface structure, a third structure disposed between the first and second surface structures in ribbing-engaging relation therewith, the opposed ribbing being interlocked across the third structure in registered, mating relation.

In particular embodiments the invention provides a structural element comprising opposed first and second laterally and longitudinally extended surface structures each having a closed figure pattern of ribbing projecting therefrom toward the opposite surface structure, a third structure disposed between the first and second surface structures in ribbing-engaging relation therewith, the opposed ribbing being interlocked across the third structure in registered mating relation.

In another embodiments, the invention provides a structural element comprising opposed first and second, laterally and longitudinally extended, generally planar surface structures each having a closed figure pattern of ribbing projecting therefrom toward the opposite surface structure in spaced relation, and a third structure disposed between the first and second surface structures in surface structure ribbing-engaged relation thereby interlocking the first and second surface structures.

In this and like embodiments, some or all of the following features are provided: the third structure bridges the space between the surface structures in registered, mating relation with the surface structure ribbing, the third structure is separately formed from the surface structures, the third structure defines a closed figure registerable with the first and second surface structure closed figure patterns of ribbing, the third structure closed figure comprises linear segments, or the third structure closed figure comprises curvilinear segments, the third structure is of relatively greater height than the pattern of ribbing on the first or second surface structures, the surface structure ribbing of at least one of the first and second surface structures defines an outward edge groove into which the opposing outward edge of the third structure ribbing interfits in structural element defining relation, and/or both of the first and second surface structure ribbings define an outward edge groove to receive the third structure ribbing.

In a further embodiments, there is provided a structural element comprising rigid, opposed first and second, laterally and longitudinally extended, generally planar surface structures each having a closed figure pattern of ribbing projecting therefrom toward the opposite surface structure in spaced relation, and a separately formed third structure disposed between the first and second surface structures in surface structure ribbing-engaged relation thereby interlocking the first and second surface structures.

In this and like embodiments the third structure bridges the space between the surface structures in registered, mating relation with the surface structure ribbing, the third structure may be locally apertured, the third structure defines a closed figure registerable with the first and second surface structure closed figure patterns of ribbing, the third structure closed figure comprises a plurality of linear segments arranged to enclose a space, and/or the third structure closed figure comprises curvilinear segments arranged about a common point to enclose a space, the third structure is of relatively greater height than the pattern of ribbing on at least one of the first or second surface structures, the surface structure ribbing of at least one of the first and second surface structures defines an outward edge groove typically having at least one side, into which the opposing outward edge of the third structure ribbing interfits in structural element defining relation, or both of the first and second surface structure ribbings define an outward edge groove having at least one side to receive the third structure ribbing, the third structure comprises separately formed ribs joined to define the closed figure pattern of ribbing, the third structure ribbing comprises fiber reinforced plastic, or the third structure itself comprises fiber reinforced plastic or metal and the first and second surface structures each comprise metal or plastics such as fiber reinforced plastics.

In a further embodiment, the invention provides a structural element comprising a first surface structure, a separately formed second surface structure, and a separately formed third structure comprising closed figures and interposed between the first and second surface structures, the first and second structures defining closed figure patterns adapted to register with the third structure closed figures in interlocking relation.

In this and like embodiments, typically, the third structure closed figures comprise intersecting segments of ribbing, at least one of the intersecting segments being buttressed at the locus of intersection.

The invention further contemplates the method of supporting opposed surface structures in a structural element, including interposing a third structure between the surface structures, the third structure having a closed figure pattern, extending ribbing to the third structure from each surface structure in a closed figure, mutually registerable pattern, and interconnecting the surface structure ribbing and the third structure at their junction.

THE DRAWING

The invention will be further described in conjunction with the accompanying drawing wherein:

FIG. 2 is an assembled view of an aircraft wing structural element;

FIG. 3 is an isometric view of a panel structural element;

FIG. 4 is a detail view thereof, somewhat enlarged, taken on line 4 in FIG. 3;

FIG. 11 is an exploded view of a further form of a structural panel;

FIG. 12 is an exploded view of a single surface structure and a third structure in which the ribbing is circular;

PREFERRED MODES

Figure 1A:
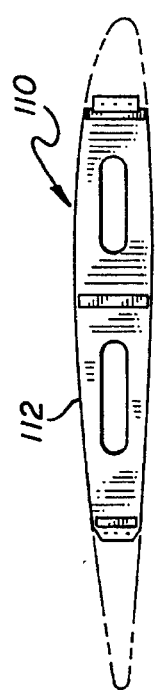
FIG. 1A is a view in vertical section of an aircraft wing illustrating a structural element according to the invention.

The term "a closed figure pattern of ribbing" herein refers to a series of laterally and/or longitudinally adjacent closed figures of ribbing forming a pattern. A "closed figure" of ribbing is one in which a straight line drawn anywhere through the figure will intersect ribbing in at least two places, and includes a circle, triangle and rectangle in which adjacent segments of ribbing are contiguous, as well as circular and rectangular spirals and other figures wherein although the ribbing segments are arranged about a common point and adjacent segments are not always contiguous, a straight line drawn anywhere through the figure will intersect ribbing in at least two places.

With reference to the drawings, in FIGS. 3 and 4 a structural element 10 is shown comprising a first or upper surface structure 12 comprising a generally planar surface portion 14 and machined thereinto from a unitary metal mass an integral pattern of ribbing 16 arranged in a series of closed FIGS. 18. The element 10 further comprises a second or lower surface structure 20 comprising a generally planar surface portion 22 and machined thereinto from a unitary metal mass an integral pattern of ribbing 24 arranged in a series of closed FIGS. 26. Ribbing 16, 24 is of a relatively low height in comparison with structures in our parent application where one of the ribbings 16, 24 extended substantially across the entire space between the planar surface structure portions 14. Such structures, while effective, require deep machining and offer fewer ribbing configurations for a given level of machining than the present invention in which the bulk of the ribbing is provided by the third structure, to be described.

The outermost portion of the ribbing 16, 24 forms an enclosing wall 28. The position of wall 28 is such that a perimetrical flange 30 is defined to which other components and parts, e.g. beam 32 can be securely mounted without reinforcement of the structural element 10.

The third structure 40 comprises a closed figure of longitudinal and transverse ribbing 42, 44 respectively. The ribbing 42, 44 is located, sized and shaped to register with and interfit with ribbings 16, 24 of the upper and lower surface structures 12, 20, as shown.

It will be noted that the respective heights of the upper ribbing 16 and the lower ribbing 24 are suitably the same, or they may be different. Together with the third structure 40, the upper and lower ribbings 16, 24 bridge the distance by which the surface portions 14 and 22 are spaced. E.g. the upper surface structure 12 and the lower surface structure 20 each have essentially a minor rib 16, 24, respectively, extended in a manner to register and mate with the substantially more vertically extended ribbing 42, 44 of the third structure 40. The relative heights of the several ribbings, 16, 24, and 42–44 may be varied for particular effects or design or machining convenience.

In addition, the upper surface structure 12 has integrally formed bosses 31 into which bolt holes 33 are tapped for securing the structural element to other components or vice versa. It is to be noted that provision of the bosses 31 does not require added bolt-on parts as in honeycomb, but these features may be added wherever desired within the capability of the machining apparatus. Further, the separation of surface structures 12, 20, may be varied by changing the height of the ribbing 16, 24, and 42–44 to provide a tapered or stepped structural element. Desirably in manufacturing, the machining is accomplished to leave relatively more material at the junctions 34 of the closed FIGS. 26, to provide increased compressive strength. Also the interior surface 36 of the surface structure 20 is suitably machined out to reduce material and thus weight and at the same time add rigidity because of the resulting raised rib 38 which results. The interconnection of the first and second surface structures 12, 20 with the third structure 40 is preferably by a tongue and groove arrangement 41, shown best in FIG. 4. Other interfitting/interlocking arrangements can be used, including single sided grooves mated with tongues, and male edges mated with female or forked tongues. The interlocked ribbing 16, 24 is suitably secured with glues, such as epoxy or urethane glues, and/or mechanically interlocked. The foregoing generally described structural element 10 can be fabricated in a number of ways into a wide variety of products, ranging from wings to walls, platforms to frameworks.

Figure 1B:
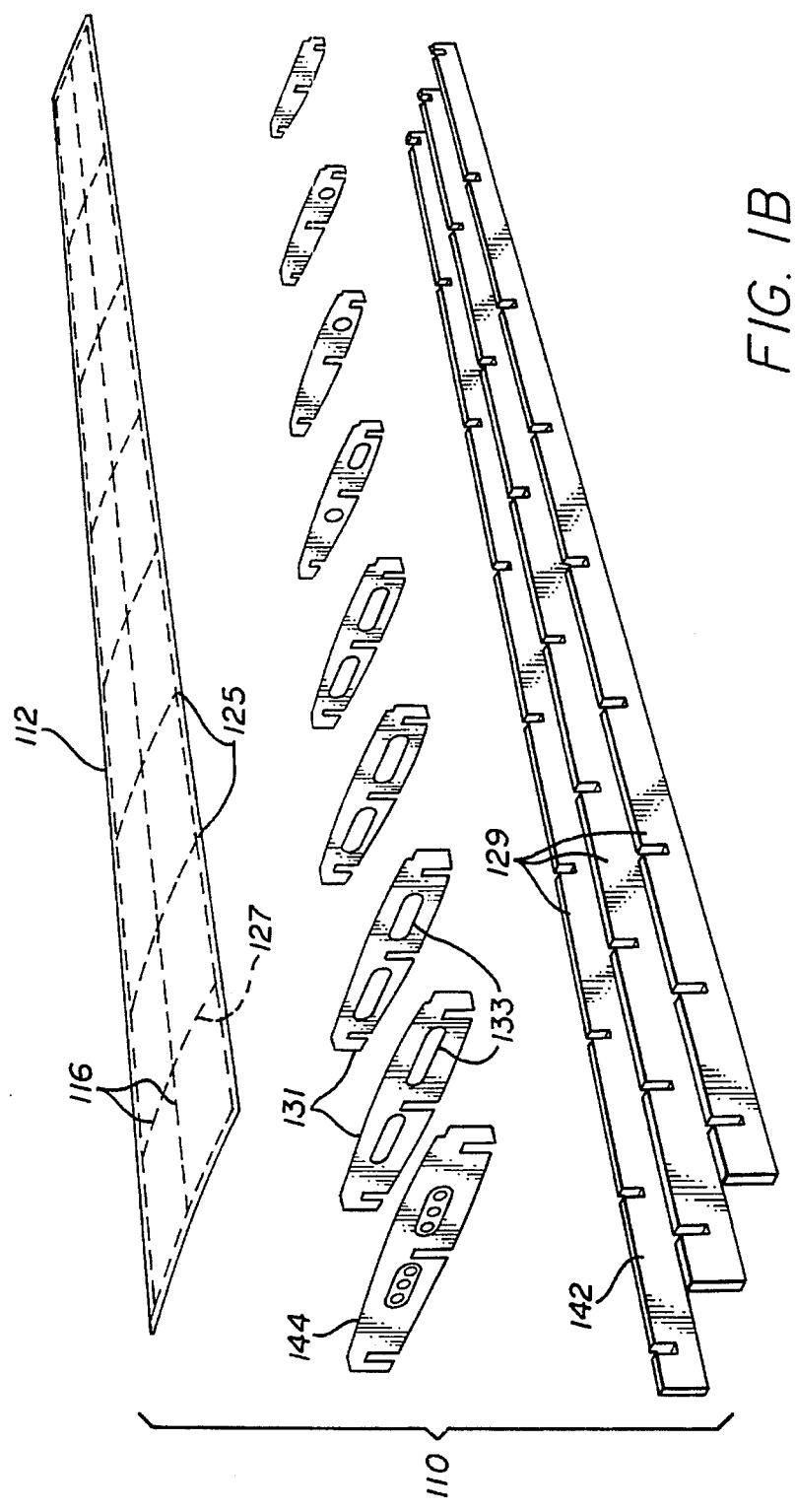
FIG. 1B is an exploded view in perspective of an aircraft wing structural element.

In FIGS. 1A, 1B and 2, for example, a wing structural element 110 is shown. The upper surface structure 112 is typically fabricated of aluminum or titanium, or may be a composite. Upper surface structure 112 ribbing 116 is formed by machining, gluing, or other form of fabrication to provide a grid pattern of closed FIGS. 125 defining suitably a series of female fittings such as rectangular grooves 127 into which the ribbing 142, 144 of the third structure 140 is fitted. The third structure 140 itself is a multipiece structure comprised of three spars 129 and a series of wing stations 131, each defining the contour and depth of the wing structural element 110. The interconnection of the spars 129 and wing stations 131 is by any suitable means, e.g. mechanical, welding, adhesive etc.

Figure 9:
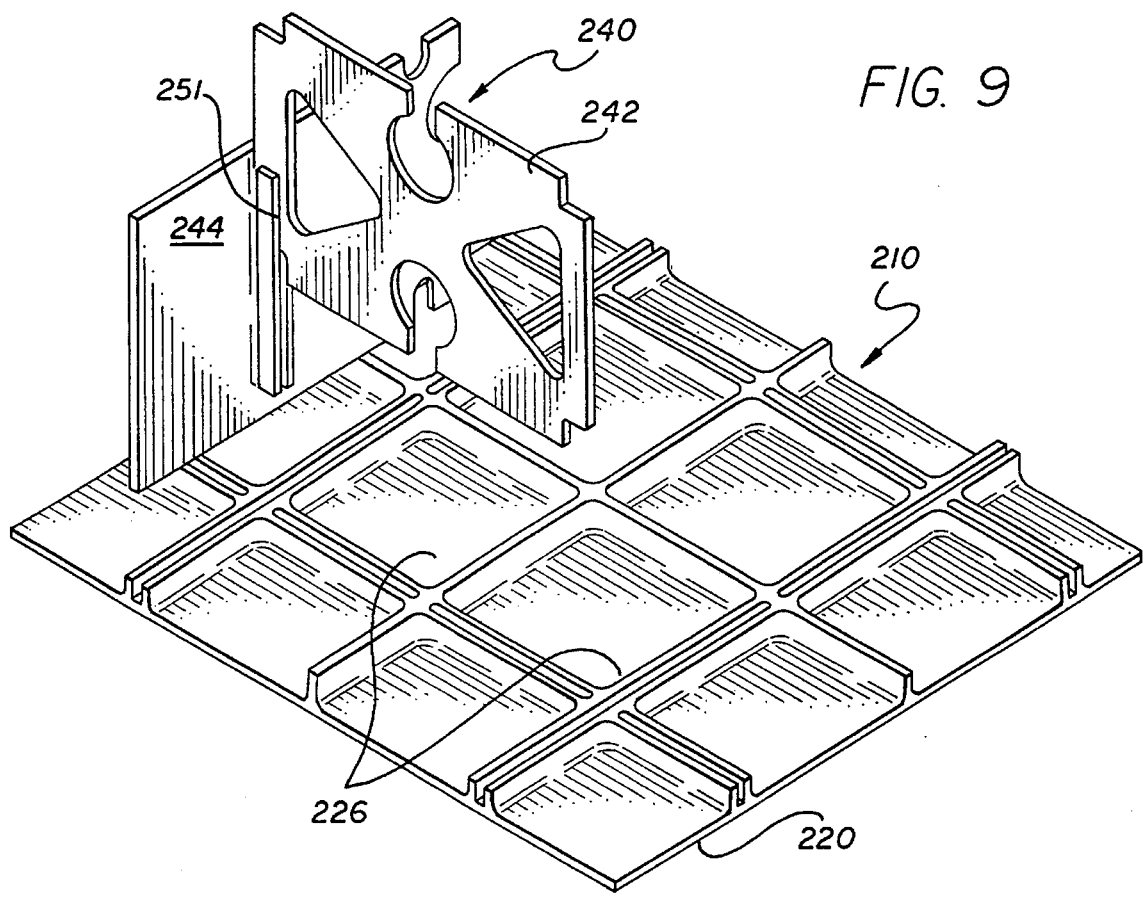
FIG. 9 is an exploded view of a further panel structural element.
Figure 10:
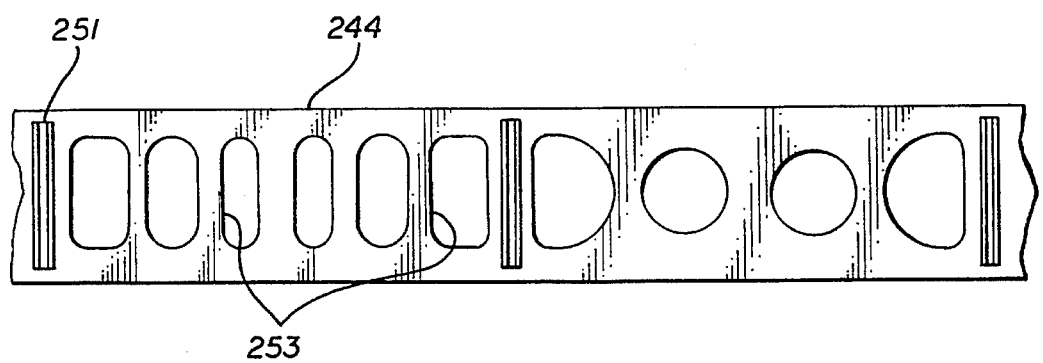
FIG. 10 is a fragmentary view of a third structure component apertured as shown.

It will be noted that the wing stations 131 are relieved, e.g. at 133, along their extent, for the passage of piping 135, for example, See FIG. 2, or to reduce weight or add structural strength against certain expected loads. This relief of the wing stations 131 is typical of the relief that can be designed into third structures 140 according to the invention. In FIGS. 9 and 10, for example, structural element 210 is shown. Structural element 210 comprises a lower surface structure 220 on which closed figure ribbings 226 are formed. Upper surface structure is omitted in this Figure for clarity of illustration. Third structure 240 comprises a longitudinal rib 244 having a vertically disposed groove 251 formed thereon. Transverse rib 242, relieved as shown for minimum weight interfits with the groove 251 on rib 244, the assembly defining a light weight, rigid structural element 210. In FIG. 10 the relief pattern in longitudinal rib 244 is shown. The apertures 253 may be formed in the longitudinal rib 244 by any conventional means.

Figure 7A:
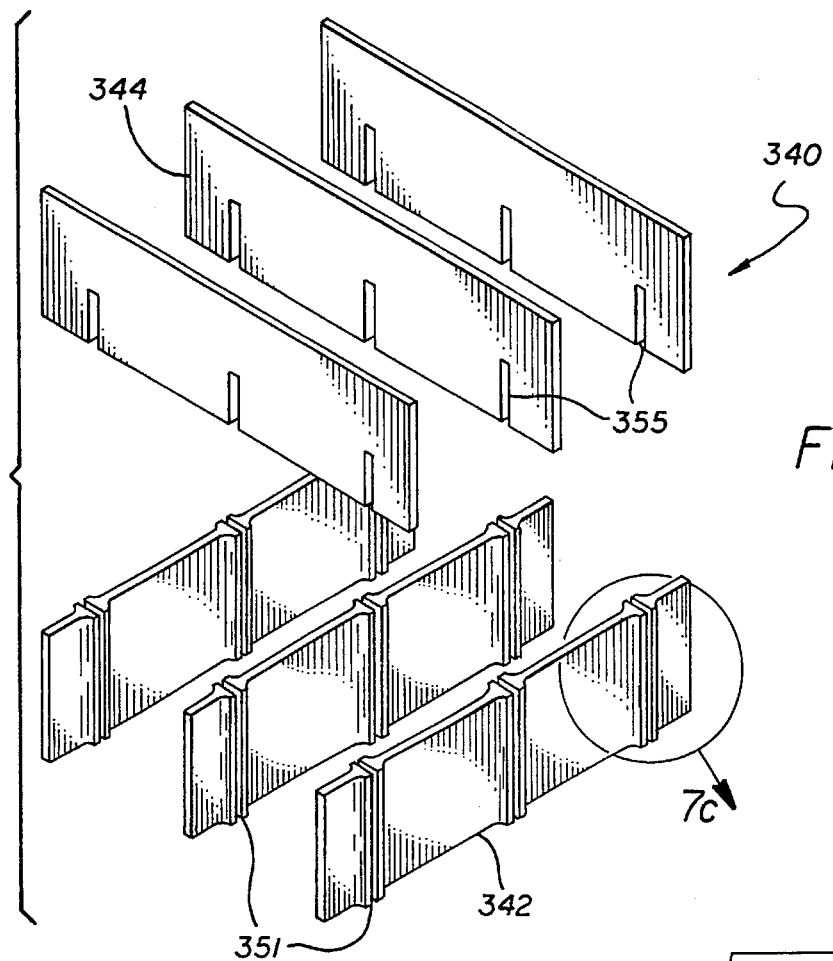
FIG. 7A is an exploded view of a multipiece third structure.
Figure 7C:
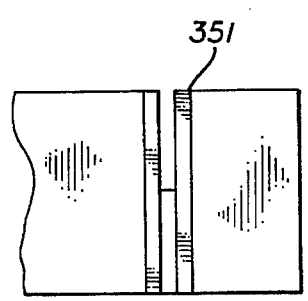
FIG. 7C is a fragmentary detail view thereof, taken on line 7C in FIG. 7A.
Figure 7B:
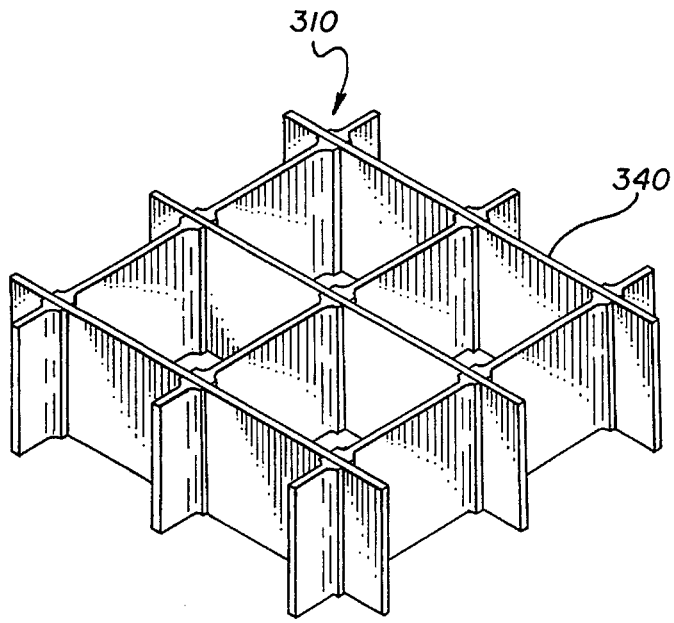
FIG. 7B is an assembled view thereof.

In FIGS. 7A, 7B and 7C, a further form of the invention structural element is shown. Structural element 310 comprises a multipiece third structure 340 having longitudinal and transverse ribbing 342, 344, the longitudinal members 342 being formed with groove structures 351 on either side, suitably to reinforce the longitudinal rib at these nodes and provide mechanical buttressing of the transverse ribs 344 which are interfitted as shown in FIG. 7B in the partly cut slots 355 defined in longitudinal ribs 344, See FIG. 7C.

Figure 5A:
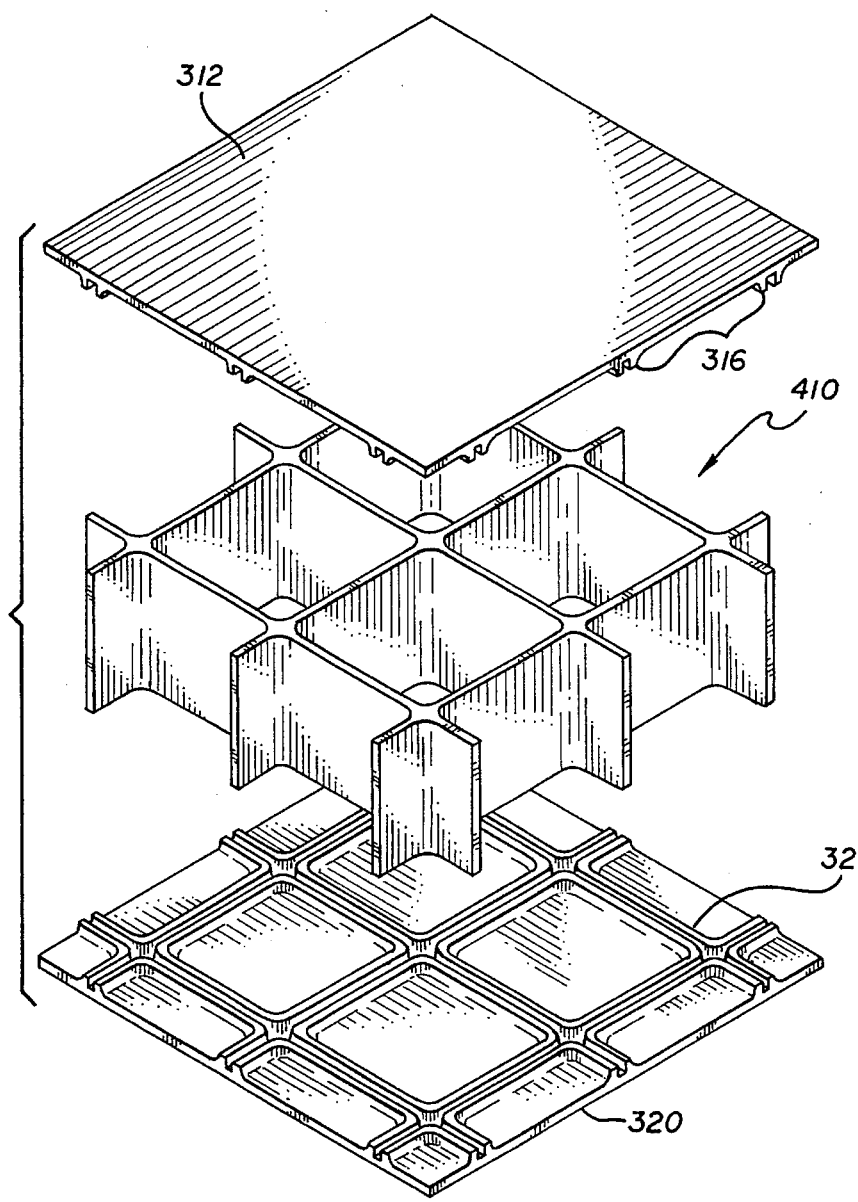
FIG. 5A is an exploded view of the panel structural element.

FIG. 5A illustrates a third structure 410 machined as a single element and shaped to interfit with ribbing 316, 324 of the upper and lower surface structures 312, 320, respectively.

Figure 8:
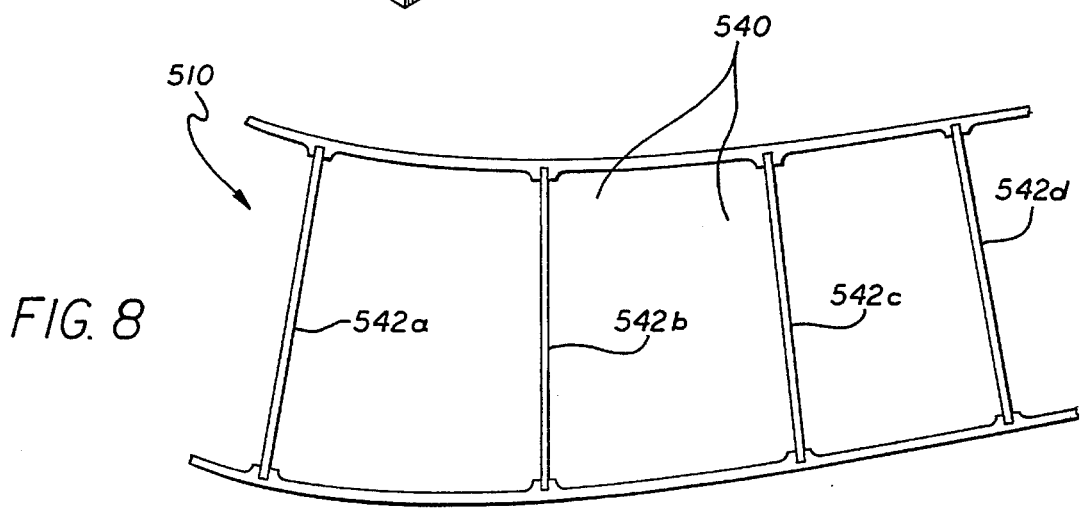
FIG. 8 is fragmentary side-elevational view of a curved structural element of changing cross-section.

As shown in FIG. 8, the shape of the structural elements of the invention are not limited to rectangular or regular forms. Structural element 510 comprises an upper surface structure 512, a lower surface structure 520, each having ribbing 516, 524, as shown, and a third structure 540, shown as a series of transverse ribs 542a, 542b, 542c, 542d, each at a different angular disposition so as to form a curvilinear, rather than rectilinear, structural element 510.

Figure 6:
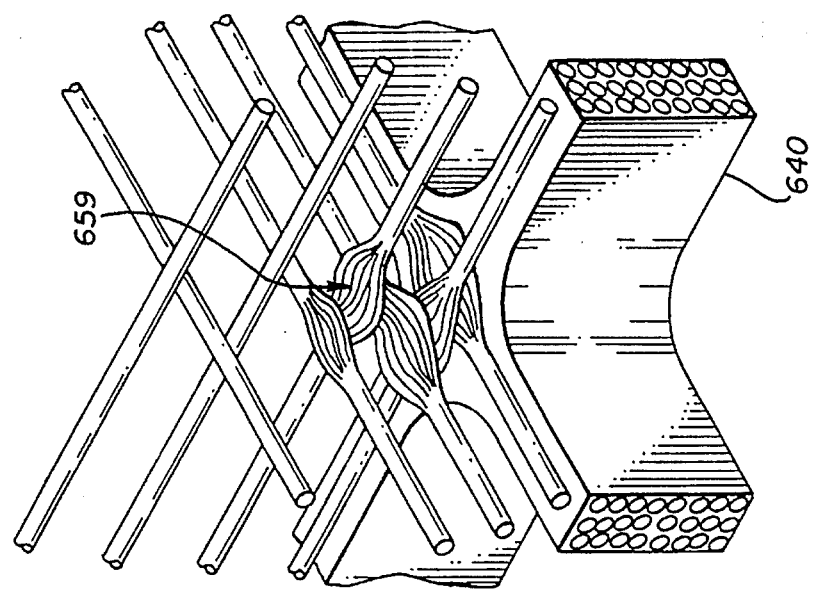
FIG. 6 is a fragmentary detail view of the third structure in FIG. 5B.
Figure 5B:
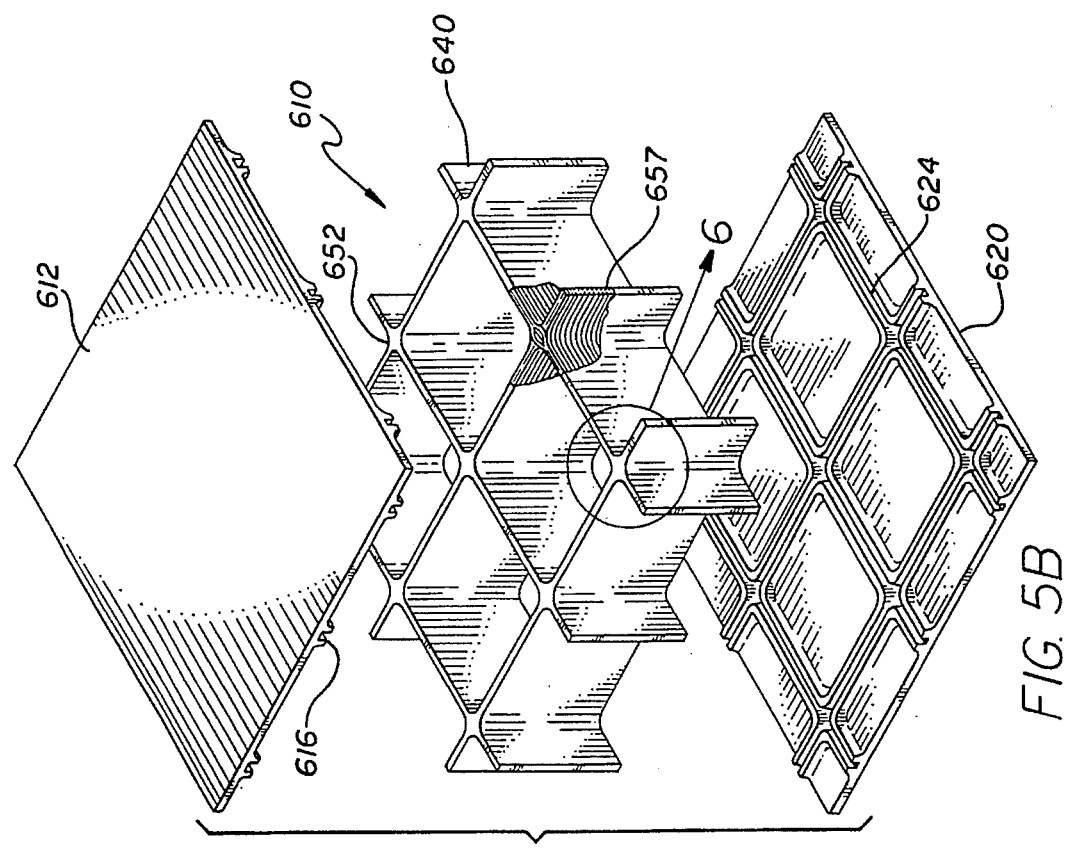
FIG. 5B is a view like FIG. 5A showing a panel structural element in which third structure is formed of plastic reinforced with fiber.

As shown in FIG. 5B, the third structure, 610 between upper surface structure 612 and lower surface structure 620 can be formed of fiber reinforced plastic, e.g. glass or carbon and like filaments 657 may be embedded in epoxy, polyester, urethane, phenolic, polyolefin or styrene or olefin copolymer resins among other resins and shaped into third structures, advantageously with flattening of the resin/fiber composite at the nodes 659 of the third structure so as to maintain a planar effect in the upper and lower surface structures, as shown in FIG. 6. Resin composites are shaped to interfit with ribbing formed on the surface structures 616, 624 as with metal third structures.

In FIG. 11 structure 710 comprises a lower surface structure 720 having minor parallel ribbing 724, third structure 740 in the form of vertically extended ribbing 742 which interfits with the ribbing 724 and ribbing 744 which lies transverse to ribbing 742. Ribbing 744 is flanged for rigidity and securement if necessary to surface structure 720 as shown at 745 and 747 and cut out or relieved at 749 to accommodate the ribbing 724 in the assembled condition of the structure 710. The upper surface structure is not shown in FIG. 11 and like figures, e.g. FIGS. 12, 13 and 14 for clarity of illustration.

Figure 14:
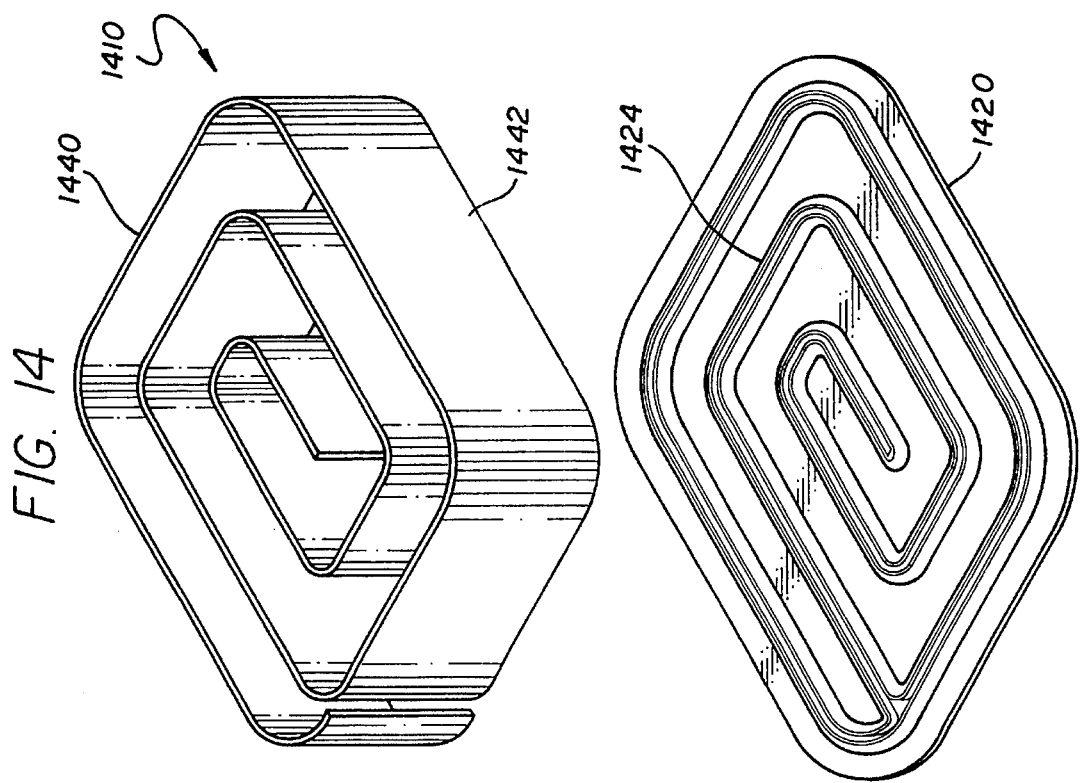
Figure 13:
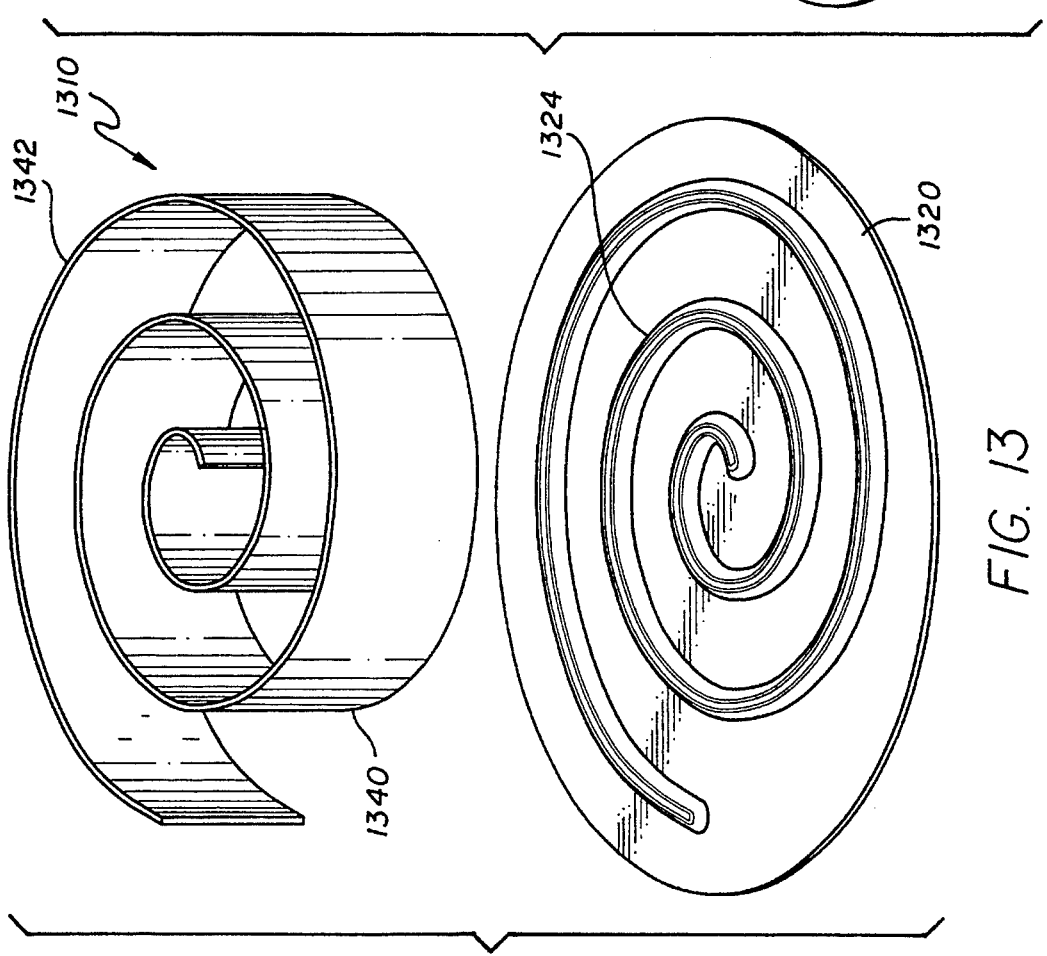
FIG. 13 is a view like FIG. 12, the ribbing being spiral rather than circular; and, FIG. 14 is a view like FIG. 13, the spiral ribbing being a squared spiral.

In FIGS. 12, 13 and 14, the structures 1210, 1310 and 1410 respectively illustrate the use of curvilinear ribbing in closed figure form. In FIG. 12 the structure 1210 comprises a lower surface structure 1220 having minor ribbing 1224 formed as a series of concentric circles. Third structure 1240 comprises a series of concentrically arranged ribbing 1242, adapted to interfit with ribbing 1224, and in which the adjacent portions of each circle may be regarded as longitudinal and transverse components of the circles. This arrangement is a closed figure in that a line drawn straight through the ribbing 1242 will intersect ribbing at two places. In FIG. 13, the structure 1310 comprises a lower surface structure 1320 having a spiral ribbing 1324 formed thereon for interfittment with third structure 1340 spiral ribbing 1342. In FIG. 14, structure 1410 comprises lower surface structure 1420 having a squared spiral ribbing 1442 formed thereon for interfittment with third structure 1440 squared spiral 1442, as in previous embodiments. As in the FIG. 12 embodiment, each of the structures 1310 and 1410 are closed figures in that a line drawn straight therethrough will twice intersect ribbing. There is an opening into the ribbing, but it is tortuous, and the objectives of the invention to have a closed figure are met.

As will be evident from the foregoing, materials used include metals such as aluminum and titanium or other metals, and composites of fibers, fillers and resins which have suitable strength and machining characteristics.

We claim:

1. Structural element comprising opposed first and second laterally and longitudinally extended surface structures each having a closed figure pattern of ribbing projecting therefrom toward the opposite surface structure, a third structure disposed between said first and second surface structures in ribbing-engaging relation therewith, said opposed ribbing being interlocked across said third structure in registered mating relation.

2. Structural element comprising opposed first and second, laterally and longitudinally extended, generally planar surface structures each having a closed figure pattern of ribbing projecting therefrom toward the opposite surface structure in spaced relation, and a third structure disposed between said first and second surface structures in surface structure ribbing-engaged relation thereby interlocking said first and second surface structures.

3. Structural element according to claim 2, in which said third structure bridges the space between said surface structures in registered, mating relation with said surface structure ribbing.

4. Structural element according to claim 2, in which said third structure is separately formed from said surface structures.

5. Structural element according to claim 2, in which said third structure defines a closed figure registerable with said first and second surface structure closed figure patterns of ribbing.

6. Structural element according to claim 5, in which said third structure closed figure comprises linear segments.

7. Structural element according to claim 5, in which said third structure closed figure comprises curvilinear segments.

8. Structural element according to claim 2, in which said third structure is of relatively greater height than said pattern of ribbing on said first or second surface structures.

9. Structural element according to claim 2, in which surface structure ribbing of at least one of said first and second surface structures defines an outward edge groove into which the opposing outward edge of said third structure ribbing interfits in structural element defining relation.

10. Structural element according to claim 9, in which both of said first and second surface structure ribbings define an outward edge groove to receive said third structure ribbing.

11. Structural element comprising rigid, opposed first and second, laterally and longitudinally extended, generally planar surface structures each having a closed figure pattern of ribbing projecting therefrom toward the opposite surface structure in spaced relation, and a separately formed third structure disposed between said first and second surface structures in surface structure ribbing-engaged relation thereby interlocking said first and second surface structures.

12. Structural element according to claim 11, in which said third structure bridges the space between said surface structures in registered, mating relation with said surface structure ribbing.

13. Structural element according to claim 12, in which said third structure is locally apertured.

14. Structural element according to claim 11, in which said third structure defines a closed figure registerable with said first and second surface structure closed figure patterns of ribbing.

15. Structural element according to claim 14, in which said third structure closed figure comprises a plurality of linear segments arranged to enclose a space.

16. Structural element according to claim 14, in which said third structure closed figure comprises curvilinear segments arranged about a common point to enclose a space.

17. Structural element according to claim 14, in which said third structure is of relatively greater height than said pattern of ribbing on at least one of said first or second surface structures.

18. Structural element according to claim 17, in which said surface structure ribbing of at least one of said first and second surface structures defines an outward edge groove into which the opposing outward edge of said third structure ribbing interfits in structural element defining relation.

19. Structural element according to claim 18, in which both of said first and second surface structure ribbings define an outward edge groove to receive said third structure ribbing.

20. Structural element according to claim 19, in which said third structure comprises separately formed ribs joined to define said closed figure pattern of ribbing.

21. Structural element according to claim 19, in which said third structure ribbing comprises fiber reinforced plastic.

22. Structural element according to claim 2, in which third structure comprises fiber reinforced plastic.

23. Structural element according to claim 22, in which said first and second surface structures each comprise metal.

24. Structural element according to claim 19, in which said third structure comprises metal.

25. Structural element according to claim 24, in which said first and second surface structures each comprise metal.

26. Structural element according to claim 2 in which said third structure comprises metal.

27. Structural element according to claim 26, in which each said first and second surface structure comprises metal.

28. Structural element comprising a first surface structure, a separately formed second surface structure, and a separately formed third structure comprising closed figures and interposed between said first and second surface structures, said first and second structures defining closed figure patterns adapted to register with said third structure closed figures in interlocking relation.

29. Structural element according to claim 28, in which said third structure closed figures comprise intersecting segments of ribbing, at least one of said intersecting segments being buttressed at the locus of intersection.

30. The method of supporting opposed surface structures in a structural element, including interposing a third structure between said surface structures, said third structure having a closed figure pattern, extending ribbing to said third structure from each surface structure in a closed figure, mutually registerable pattern, and interconnecting the surface structure ribbing and said third structure at their junction.

31. Structural element comprising a first laterally and longitudinally extended surface structure, and opposed thereto a second laterally and longitudinally extended surface structure, said first and second surface structures having ribbing on their opposed surfaces, and a third structure comprising a closed figure pattern of ribbing disposed between said first and second surface structures in surface structure ribbing-engaged relation thereby interlocking said first and second surface structures.

32. Structural element according to claim 31, in which said third structure comprises a plurality of segments arranged to bridge the space between said surface structures.

33. Structural element according to claim 31, in which said third structure comprises a plurality of separately formed segments interlocked in third structure defining relation.

* * * * *